United States Patent [19]

Calmettes et al.

[11] Patent Number: 4,517,708

[45] Date of Patent: May 21, 1985

[54] CLAMP

[75] Inventors: Lionel Calmettes, Ozoir la Ferriere; Michel André, Romorantin Lanthenay, both of France

[73] Assignee: Establissements Caillau, Billancourt, France

[21] Appl. No.: 575,488

[22] Filed: Feb. 1, 1984

Related U.S. Application Data

[63] Continuation of Ser. No. 421,322, Sep. 22, 1982.

[30] Foreign Application Priority Data

Nov. 6, 1981 [FR] France .................................. 81 20870

[51] Int. Cl.³ .................. B65D 63/00; F16L 47/00
[52] U.S. Cl. .................................................. 24/20 CW
[58] Field of Search ......... 24/20 CW, 20 EE, 20 TT, 24/20 W, 20 R, 20 S, 23 EE, 23 W, 22, 23 R, 21, 270, 16 R; 248/74 B

[56] References Cited

U.S. PATENT DOCUMENTS

| 254,635 | 3/1882 | Gifford | 24/20 EE |
|---|---|---|---|
| 1,705,895 | 3/1929 | Blair | 24/20 CW |
| 4,275,484 | 6/1981 | Irio et al. | 24/20 R |
| 4,299,012 | 11/1981 | Oetiker | 24/20 CW |

FOREIGN PATENT DOCUMENTS

| 2511575 | 9/1976 | Fed. Rep. of Germany | 24/19 |
|---|---|---|---|
| 3017178 | 11/1981 | Fed. Rep. of Germany | 24/20 W |
| 2470275 | 6/1981 | France | 24/20 R |
| 932116 | 7/1963 | United Kingdom | 24/20 EE |

Primary Examiner—John J. Wilson
Attorney, Agent, or Firm—Lewis H. Eslinger

[57] ABSTRACT

The present invention relates to a re-usable clamp constituted by a wound over strap of metal and comprising, near to the two ends of the strap, two radial folds or lugs projecting externally from the strap, the first of said lugs extending into a portion which follows the periphery of the clamp to constitute a sole-plate extending at least over the distance separating the two lugs, whereas the second lug is also provided with an extension which is substantially parallel to the periphery of the clamp and situated at a distance therefrom which is nearly equal to the height of one lug; the sole-plate extending from the first lug is provided with at least one asperity projecting externally from the strap and designed to cooperate, when the clamp is in a closed but untightened position, with the bearing part of a recess correspondingly provided in the strap behind the second lug.

3 Claims, 4 Drawing Figures

CLAMP

This is a continuation of application Ser. No. 421,322, filed Sept. 22, 1982, now abandoned.

The present invention relates to a clamp.

European Patent Application No. 3192, which corresponds to U.S. Pat. No. 4,275,484, has described a reusable clamp, constituted by a wound over strap of metal and comprising, near to its two ends, two radial folds or lugs. The first of these lugs extends into a portion which follows the periphery of the clamp to constitute a sole plate extending at least over the distance separating the two lugs. The second lug is also provided with an extension which is substantially parallel to the periphery of the clamp and situated at a distance therefrom which is nearly equal to the height of one lug. The extension of the second lug is provided with a hooked portion which constitutes a clamping member cooperating with the first lug when the clamp is tightened with a tool which uses the two lugs for gripping.

Such a clamp is particularly easy to fit and to tighten into place, especially when the objects on which they are fitted, such as, for example, flexible tubes mounted on rigid pipes, have small diameters. In the case however of objects of large diameter, a number of practical difficulties are noted. Indeed, the operator has to hold the ends of the strap face to face, when gripping his clamping tool on the two lugs, in order to fasten the hooked portion of the second lug on to the first lug. These difficulties especially arise when the articles to be clamped are relatively inaccessible and are in cramped locations, for example when connecting certain pipes in a motor-vehicle engine.

It is then advantageous to have a clamp whose shape and in particular whose diameter before tightening are very close to that of the articles to be clamped but are slightly greater in diameter. The clamp can be fitted into place and then tightened with only one hand, this being an advantage in inaccessible or cramped areas.

It is therefore an object of the present invention to propose a clamp of the type described hereinabove, but with an improvement designed to make it more easily fittable.

According to the invention, the sole-plate extending from the first lug is provided with at least one asperity projecting externally, and designed to cooperate, when the clamp is in a closed but untightened position, with the bearing part of a recess correspondingly provided in the strap behind the second lug.

Due to this design, the clamp can be presented to the user in a form which is very near to the form it will have after tightening. The two ends of the strap are joined together by the temporary cooperation of the asperity with the recess, this achieving also an appropriate alignment of these ends. When tightening the clamp as indicated hereinabove, the fastening of the hooked portion of the second lug onto the first lug cancels out the cooperation of the asperity with the bearing part of the recess. Any alteration for any reason whatsoever, in the fastening of the hooked portion will restore the cooperation of the asperity with the bearing part, thereby adding safety to the clamping.

The invention will be more readily understood on reading the following description with reference to the accompanying drawings, in which.

Figure 1:
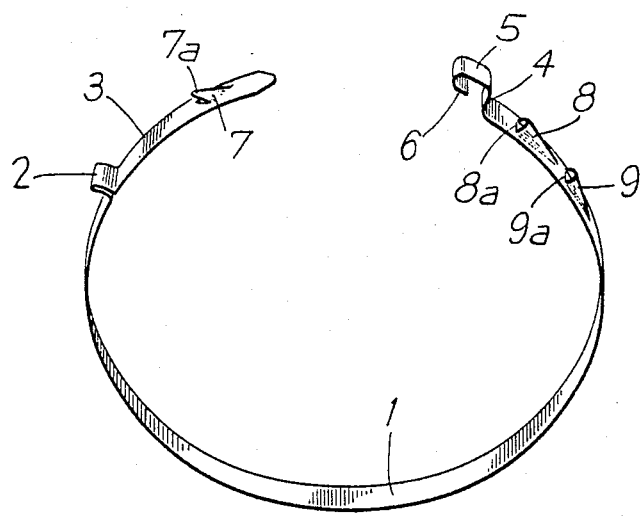
FIG. 1 is a perspective view of a clamp immediately after production.

Referring to the drawings, the clamp is constituted by a strap 1, comprising a first lug 2 and its extending part 3 forming sole-plate, as well as a second lug 4, its extending part 5 and the hooked portion 6 at the end thereof.

At the free end of the sole-plate 3 is provided an asperity 7 preferably constituted by a stamped-in portion. Towards the lug 2, the open end of stamped-in portion is provided with a nose 7a, the use of which will be explained hereinafter.

At the back of the second lug 4 are provided two recesses 8 and 9 which project from the external face of the strap and are preferably also constituted by stamped-in portions. The volume of these recesses which are open on the inner face of the strap is at least equal to the projecting volume of the asperity 7 whereas their front edge 8a–9a, against which nose 7a of asperity 7 abuts, is preferably straight.

Coming out of the manufacture, the clamp has the shape shown in FIG. 1. Indeed, the elasticity of the metal virtually prevents the clamp from being closed when the strap 1 is wound over into its circular form. Its two ends are therefore at a relative distance one from the other and it would be difficult in these conditions to fasten the hooked portion 6 on the lug 2, even with the help of an appropriate tool.

Figure 2:
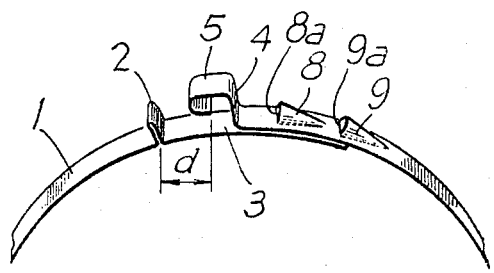
FIG. 2 is a similar view to that of FIG. 1, the clamp being nearly closed.

Therefore, normally, the clamp will be presented to the user with the asperity 7 engaged inside the recess 8, the nose part 7a cooperating with the edge 8a (FIG. 2). The shape and in particular the diameter of the clamp have then, dimensions substantially larger than the corresponding dimensions of the article to be clamped, so that the clamp can be threaded on to the object to be clamped until it reaches the correct place and then the clamp can be installed.

Figure 3:
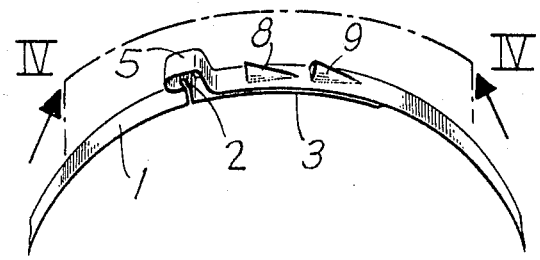
FIG. 3 is a similar view to that shown in FIG. 2, the clamp being tightly closed.
Figure 4:
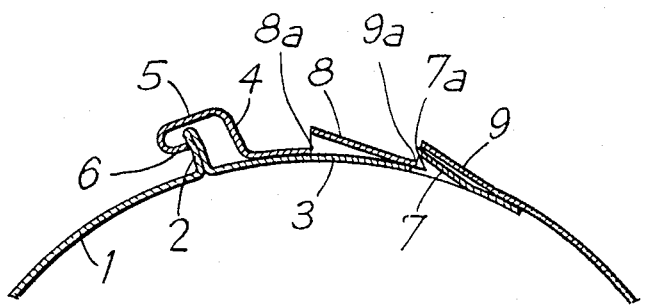
FIG. 4 is a cross-section along line IV—IV of FIG. 3.

The clamping is thereafter achieved easily, under normal conditions, with a pliers-type tool gripping on the back of the lugs 2 and 4 to fasten the hooked portion 6 over the lug 2 (FIG. 3).

In some cases however, it may be impossible to thread the clamp shaped as shown in FIG. 2, over the object to be clamped, such as when replacing an existing hose clamp without first removing the hose. Then it will be necessary to release the asperity 7 from the recess 8 and to pass the clamp around the object. The asperity 7 will then be replaced by hand inside the recess 8 and the clamp will be tightened in the normal way (FIG. 3).

No matter what method is used for positioning the clamp, when the clamp is tightened, the asperity 7 leaves recess 8 backwards to engage into recess 9. It should be noted at this stage that the bearing part constituted by the front edge 9a cannot cooperate permanently with the asperity 7. The relative position of the recesses 8 and 9 is therefore defined in such a way that the distance between their front edges 8a and 9a is very slightly more than the distance d, separating the lug 2 from the end of the hooked portion 6 after clamping.

But in the event of a deliberate or accidental unfastening of the hooked portion 6 on to the lug 2, the asperity 7 immediately cooperates with the bearing portion constituted by the front edge 9a of the recess 9, thereby preventing any inadvertent opening of the clamp. These dispositions therefore constitute an added guarantee of safety.

The invention is in no way limited to the description given hereinabove, nor is the number of asperities and of corresponding recesses provided in the clamp, limited; in addition, the shape of these two elements can vary, provided they can still actively cooperate in the conditions indicated hereinabove.

What is claimed is:

1. Re-usable clamp, comprising a wound metal strap having two ends, said strap having two radial lugs projecting externally from the strap at respective ends thereof, the first of said lugs extending into a portion which follows the periphery of the clamp to constitute a sole-plate extending at least over the distance separating the two lugs, the second lug is formed with an extension arranged substantially parallel to the periphery of the clamp and situated at a distance therefrom nearly equal to the height of one lug, said extension of the second lug being provided with a short hooked portion having a free end constituting a clamping member for fastening over the first lug in a tightened position of the clamp, said sole-plate including an extending part extending from the first lug and having at least one asperity projecting externally from an end of said extending part to cooperate with a bearing element of a recess correspondingly formed in the strap behind the second lug, wherein the asperity in said extending part is spaced from said first lug by a length greater than the length from the extension of the second lug to the bearing element of said recess behind the second lug, whereby when said clamp is in a closed but untightened position said asperity engages said bearing element of said recess and when said clamp is in said tightened position said asperity does not engage said bearing element of said recess.

2. A clamp as claimed in claim 1, wherein two recesses are formed in said strap behind the second lug, one of said at least one asperity and a corresponding recess coming into immediate engagement, upon an unfastening of the hooked portion of the second lug from the first lug.

3. A clamp as claimed in claim 1, wherein said at least one asperity is stamped into the strap.

* * * * *